(12) United States Patent
Sharma et al.

(10) Patent No.: US 9,852,776 B2
(45) Date of Patent: *Dec. 26, 2017

(54) APPLICATION TUNE MANIFESTS AND TUNE STATE RECOVERY

(71) Applicant: Rovi Technologies Corporation, San Jose, CA (US)

(72) Inventors: Sean K. Sharma, San Jose, CA (US); Nicolae Surpatanu, San Jose, CA (US); Bradley R. Pettit, Los Gatos, CA (US); Junmin Hao, Cupertino, CA (US)

(73) Assignee: Rovi Technologies Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,655

(22) Filed: Jun. 2, 2015

(65) Prior Publication Data
US 2015/0294688 A1    Oct. 15, 2015

Related U.S. Application Data

(63) Continuation of application No. 12/396,341, filed on Mar. 2, 2009, now Pat. No. 9,069,585.

(51) Int. Cl.
*G06F 9/54* (2006.01)
*G11B 27/34* (2006.01)
(Continued)

(52) U.S. Cl.
CPC .......... *G11B 27/34* (2013.01); *G06F 9/44542* (2013.01); *G11B 27/102* (2013.01); *H04N 21/235* (2013.01); *H04N 21/435* (2013.01); *H04N 21/4325* (2013.01); *H04N 21/4333* (2013.01); *H04N 21/478* (2013.01); *H04N 21/4882* (2013.01); *H04N 21/8173* (2013.01)

(58) Field of Classification Search
None
See application file for complete search history.

(56) References Cited

U.S. PATENT DOCUMENTS

2005/0025465 A1*  2/2005  Danieli ............... H04N 5/9201
                                                                  386/243
2006/0177197 A1*  8/2006  Nakamura ............ G11B 20/10
                                                                  386/213

(Continued)

*Primary Examiner* — Andy Ho
*Assistant Examiner* — Abdou Seye
(74) *Attorney, Agent, or Firm* — Haley Guiliano LLP

(57) ABSTRACT

In accordance with one or more aspects, a request to run an application is received. The application has an associated tune manifest that identifies one or more resources that the application may use. The tune manifest is compared to a device resource record, and a check is made, based at least in part on the comparing, whether the one or more resources identified in the tune manifest can be satisfied by the device. If the one or more resources identified in the tune manifest can be satisfied by the device, then the application is run; otherwise, a notification of a conflict between the application and the device is presented. Additionally, when the application exits, a device tune state that identifies a content source to which the device was tuned prior to running the application can be retrieved and the device restored to this device tune state.

18 Claims, 7 Drawing Sheets

(51) Int. Cl.
*G06F 9/445* (2006.01)
*H04N 21/235* (2011.01)
*H04N 21/435* (2011.01)
*H04N 21/478* (2011.01)
*H04N 21/81* (2011.01)
*G11B 27/10* (2006.01)
*H04N 21/432* (2011.01)
*H04N 21/433* (2011.01)
*H04N 21/488* (2011.01)

(56) References Cited

U.S. PATENT DOCUMENTS

2007/0174476 A1* 7/2007 McEnroe ......... H04N 21/23439
709/231
2008/0244599 A1* 10/2008 Hodson ................ G06F 9/5044
718/104
2010/0017501 A1* 1/2010 Yen ........................ G06F 21/10
709/219

* cited by examiner

APPLICATION TUNE MANIFESTS AND TUNE STATE RECOVERY

CROSS-REFERENCE TO RELATED APPLICATION

This application is a continuation of prior U.S. patent application Ser. No. 12/396,341, filed Mar. 2, 2009. The aforementioned, earlier-filed application is hereby incorporated by reference herein in its entirety.

BACKGROUND

As computing devices and television viewing have begun to merge, enhanced functionality can be made available to television viewers. One type of such enhanced functionality is the ability to run applications on devices that also provide for playback of television programming. While such enhanced functionality has its advantages, it is not without its problems. One such problem is that resource requirements of different applications can conflict, and can be inconsistent with resource capabilities of the device. Accordingly, the running of such applications can fail or provide unacceptable results, decreasing the usability of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request to run an application is received. The application has an associated tune manifest that identifies one or more resources that the application may use. The tune manifest is compared to a device resource record, and a check is made, based at least in part on the comparing, whether the one or more resources identified in the tune manifest can be satisfied by the device. If the one or more resources identified in the tune manifest can be satisfied by the device, then the application is run; otherwise, a notification of a conflict between the application and the device is presented.

In accordance with one or more aspects, an identification is made as to when an application that has been running on a device is exited. In response to the application being exited, a device tune state that identifies a content source to which the device was tuned prior to running the application is retrieved, and the device is restored to this device tune state.

BRIEF DESCRIPTION OF THE DRAWINGS

The same numbers are used throughout the drawings to reference like features.

DETAILED DESCRIPTION

Application tune manifests and tune state recovery are discussed herein. A consumer device that plays back audio/video content can also execute one or more applications. When a request to run an application is received, the device obtains a tune manifest for the application that identifies one or more resources of the device that the application may try to use when it runs. The device then checks a device resource record to determine whether the one or more resources are available. The application is run if the one or more resources are available, and the user is notified of a conflict if the one or more resources are not available.

Additionally, prior to running an application, a device tune state can be saved. The device tune state identifies a content source to which the device was tuned prior to running the application, and can also identify a particular location of content being received from that content source. This particular location can be, for example, the location of content being played back from a digital video recorder or video-on-demand server at the time a request to run the application is received. When the application exits, the saved device tune state can be retrieved and the device can be returned to that saved device tune state.

Figure 1:
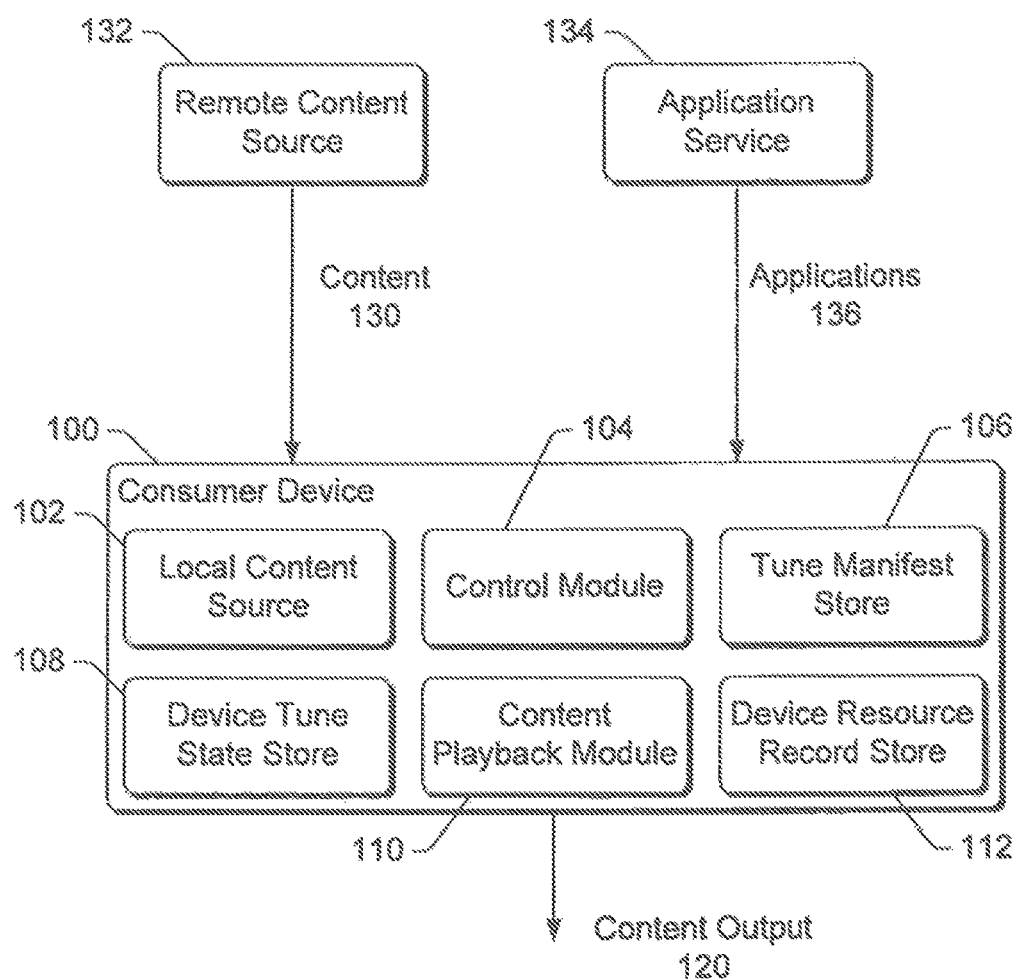
FIG. 1 illustrates an example consumer device implementing the application tune manifests and tune state recovery in accordance with one or more embodiments.

FIG. 1 illustrates an example consumer device 100 implementing the application tune manifests and tune state recovery in accordance with one or more embodiments. Consumer device 100 can be any of a variety of devices that output video for display. For example, consumer device 100 can be a computer, such as a desktop computer, server computer, a mobile station, an entertainment appliance, a set-top box communicatively coupled to a display device, a video playback device (e.g., digital video recorder (DVR), digital versatile disk (DVD) player, etc.), a television, a cell or other wireless phone, a game console, a hand-held game console, a traditional set-top box, an automotive PC, and so forth.

Consumer device 100 includes a local content source 102, control module 104, tune manifest store 106, device tune state store 108, content playback module 110, and device resource record store 112. Generally, content playback module 110 outputs content 120 for playback. Control module 104 allows one or more applications to be executed by consumer device 100, each of which can output additional content as content output 120. An application executing on consumer device 100 can manage its own content output 120, or alternatively manage its content output via content playback module 110. In one or more embodiments, control module 104 is an operating system of consumer device 100.

The content 120 that is output or played back by consumer device 100 refers to one or more of a variety of different types of content that can be displayed or otherwise presented to a user. Oftentimes content 120 is audio/video content such as television programs or other programs (e.g., movies, sitcoms, commercials, news broadcasts, documentaries, sporting events, and so forth). Alternatively, content 120 can be only one type of content (e.g., just audio content, just video content, etc.), or can be other types of content (e.g., images, text, and so forth).

Content playback module 110 can obtain content for playback from a variety of different sources, including local and/or remote sources. This obtaining of content from a particular source is also referred to as device 100 or module 110 being tuned to that particular source. Regardless of the source, content playback module 110 plays back the content it obtains as content output 120. In one or more embodiments, content playback module 110 obtains content 130 from remote content source 132. Remote content source 132 can be, for example, a television broadcast station, a network storage device, a video-on-demand service, and so forth. Different content sources 132 can have different channels that can be tuned to (e.g., different television channels), or alternatively each different channel can be referred to as a different content source 132. Content 130 can be obtained in a variety of different manners, such as an analog or digital broadcast, via a cable or satellite transmission, via a network (e.g., the Internet, a local area network, a cellular or other wireless phone network, etc.), and so forth.

Content playback module 110 can also obtain content from local content source 102. Local content source 102 is a local storage device that is coupled to or included as part of consumer device 100. For example, local content source 102 can be a fixed or removable optical disc, a fixed or removable magnetic disk, a fixed or removable solid state (e.g., flash memory) device, a portable content player, and so forth.

Content playback module 110 obtains content from local and/or remote sources and outputs the obtained content as content output 120. Content playback module 110 converts the obtained content into a format that can be played back (e.g., displayed by a display device, played back by speakers, etc.) and outputs the converted content as content 120. Content playback module 110 can also receive input from a user (e.g., via a remote control device) or other component or module of device 100 to control output 120, such as to pause playback of the content, select particular content for playback, select a particular content source, fast forward or rewind through the content, and so forth.

In one or more embodiments, consumer device 100 plays back content output 120 (e.g., displays video content, plays back audio content, and so forth). In other embodiments, consumer device 100 generates one or more signals based on the content it obtains and outputs, as content output 120, these generated signals to one or more other devices (e.g., televisions, projectors, speakers, etc.) which in turn display or otherwise present the content.

Control module 104 allows one or more applications to be executed by consumer device 100, each of which can output additional content as content output 120. This additional content can be output separately from the content obtained by playback module 110 by tuning to a local and/or remote source. For example, output of the content obtained by playback module 110 can be temporarily suspended while the additional content from an application is output. Alternatively, content playback module 110 can combine this additional content from an application with the content that module 110 has obtained, and display both concurrently. The manner in which both the content that module 110 obtains and the additional content from the application are displayed concurrently can vary, such as the two different contents being displayed in different windows, the additional content overlaying at least a portion of the content module 110 obtains, and so forth.

Control module 104 receives a request to run an application from a user of consumer device 100 or alternatively from another component or module of device 100 or alternatively from another device. A user of device 100 can request to run an application in a variety of different manners, such as by selecting an option to run the application that is displayed by content playback module 110 (e.g., displayed as a link, displayed as an icon, etc.), by selecting a particular button or key on a remote control device that is associated with running one or more applications, and so forth.

When a request to run an application is received, control module 104 obtains the requested application from application service 134. Application service 134 can be implemented on one or more of a variety of different types of computing devices, analogous to consumer device 100 discussed above. Applications 136 providing a variety of different functionality are available from application service 134, such as applications that provide additional information to a user, applications that obtain content from one or more other content sources for playback, applications that allow user interaction (e.g., games, voting or feedback applications, etc.), and so forth. Alternatively, one or more applications 136 can be obtained from a local application source, such as a source coupled to consumer device 100 or included as part of consumer device 100, analogous to local content source 102 discussed above.

Each application 136 can be one or more of a variety of different types of applications. For example, an application 136 can be object code that is run by one or more processors or other controllers of consumer device 100. By way of another example, an application 136 can be a script that is written in a scripting language and is run by another application.

It is to be appreciated that consumer device 100 includes or is otherwise associated with various resources that can be used by content playback module 110 and/or one or more applications 136. These resources are typically not unlimited and thus are shared by the various modules, components, applications, and so forth of consumer device 100. These resources can include, for example, hardware resources such as memory (e.g., an amount of RAM (random access memory) or other storage resources), bandwidth capacity of a network to which consumer device 100 is coupled, a number of windows (e.g., picture-in-picture windows) that can be displayed concurrently, and so forth. The resources in or available to consumer device 100 can result in restrictions on content that can be obtained, a number of content sources that can be tuned to concurrently, a number of applications that can run concurrently, and so forth.

For example, the available resources (e.g., memory) of consumer device 100 may restrict device 100 to being able to concurrently display one high-definition (HD) content stream and one picture-in-picture window, or alternatively concurrently display one standard-definition (SD) content stream with six picture-in-picture windows. By way of another example, the available resources of consumer device 100 may restrict device 100 to operating in an environment (e.g., a home) in which no more than two HD content streams and two SD content streams can be played back by devices in that environment concurrently. By way of yet another example, the available resources of consumer device 100 may restrict device 100 to receive streaming content from a website or other source at not greater than a particular bit rate.

Consumer device 100 can obtain information identifying the available resources of consumer device 100 in a variety of different manners. In one or more embodiments, consumer device 100 is programmed or otherwise configured with this information by a designer or distributor of consumer device 100 and/or by a service provider (e.g., a provider of network access). In other embodiments, consumer device 100 automatically detects this information. For example, consumer device 100 can automatically detect the amount of memory or other storage in device 100 in a variety of conventional manners, consumer device 100 can automatically detect available bandwidth of a network to which device 100 is coupled in a variety of conventional manners, and so forth.

Each application 136 can have a corresponding tune manifest that identifies one or more resources of consumer device 100 that the application may use. These one or more resources of consumer device 100 that the application may use refers to a maximum amount of resources that the application is expected to use, even though the application may not be using all those resources at any given time. For example, an application may be able to display one HD content stream and three picture-in-picture windows concurrently even though the application oftentimes displays only one SD content stream and one picture-in-picture window concurrently. The tune manifest for that application would identify that the one or more resources of consumer device 100 that the application may use is one HD content stream and three picture-in-picture windows concurrently. The tune manifest for each application 136 running on consumer device 100 is maintained in tune manifest store 106.

In one or more embodiments, each application 136 includes an associated tune manifest. Thus, when an application 136 is obtained from application service 134, the tune manifest associated with that application is also obtained. Alternatively, the tune manifest associated with an application can be obtained from another service or device.

Consumer device 100 maintains a device resource record store 112 that identifies the available resources of consumer device 100 at any given time. It is to be appreciated that some of the available resources of consumer device 100 may change frequently while others change infrequently. For example, the available RAM or other memory in consumer device 100 typically does not change frequently, whereas a number of HD content streams and/or SD content streams being played back by devices in the same environment (e.g., a home) as consumer device 100 may typically change frequently.

In the example of FIG. 1, tune manifest store 106 and device resource record store 112 are illustrated as two separate stores. Alternatively, a tune manifest for an application that is running on consumer device 100 can be maintained in device resource record store 112. The resources that an application may use, as identified in a tune manifest associated with that application, can be viewed as being "reserved" and thus not available for one or more other applications to use. This can effectively reduce the available resources of consumer device 100.

Figure 2:
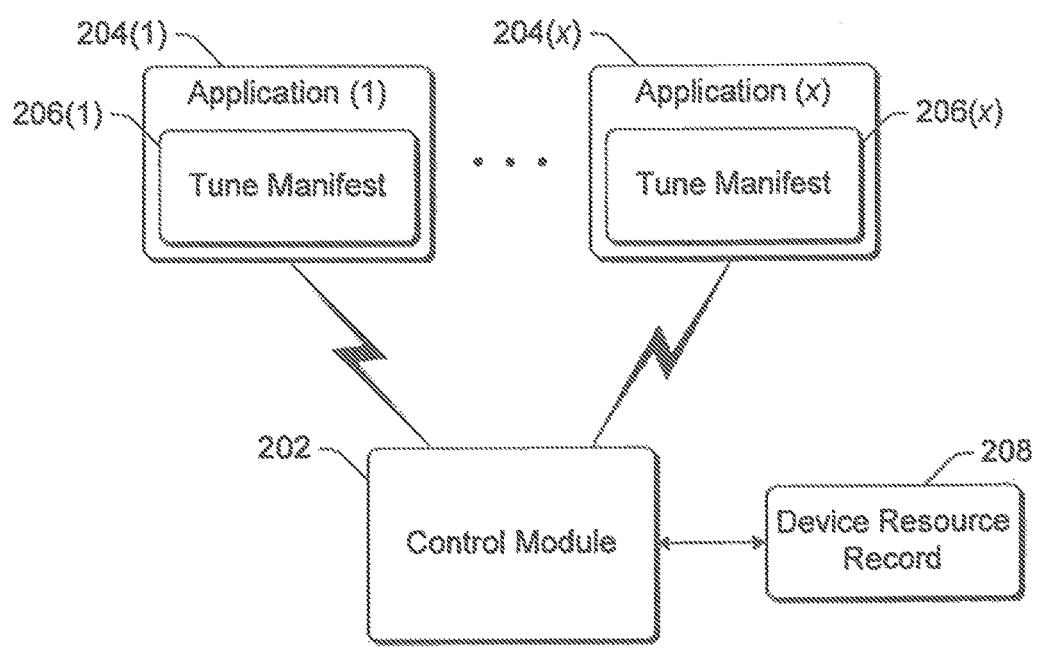
FIG. 2 illustrates an example system using tune manifests in accordance with one or more embodiments.

FIG. 2 illustrates an example system 200 using tune manifests in accordance with one or more embodiments. System 200 includes a control module 202 which can be, for example, control module 104 of FIG. 1. Control module 202 manages execution of one or more applications 204(1), . . . , 204(x), each of which can be, for example, an application 136 of FIG. 1. Each application 204 also has an associated tune manifest 206(1), . . . , 206(x). Tune manifests 206 are illustrated as being part of their associated applications in FIG. 2, although alternatively tune manifests 206 can be maintained separately from their associated applications as discussed above. System 200 also includes a device resource record 208 which can be, for example, a device resource record maintained in store 112 of FIG. 1.

During operation, control module 202 receives a request to run an application 204. In response to this request, control module 202 obtains the requested application 204 and the tune manifest 206 associated with the requested application 204. Control module 202 then compares the obtained tune manifest 206 with device resource record 208. As part of this comparison, control module 202 determines whether the one or more resources identified in the obtained tune manifest 206 can be satisfied by the device implementing system 200. The one or more resources identified in the obtained tune manifest 206 can be satisfied if these one or more resources identified in the obtained tune manifest 206 are currently available in the device implementing system 200. This determination can be made based on the available resources of the device implementing system 200 at any given time, as identified in device resource record 208 and optionally one or more tune manifests 206 of applications already running in system 200.

For example, assume that the obtained tune manifest 206 identifies that the associated application may use one HD content stream and three picture-in-picture windows concurrently. If the device resource record 208 indicates that one HD content stream and three picture-in-picture windows can currently be displayed concurrently, then the device implementing system 200 satisfies the obtained tune manifest 206. However, if the device resource record 208 indicates that one HD content stream and only one picture-in-picture window can currently be displayed concurrently, then the device implementing system 200 does not satisfy the obtained tune manifest 206. Whether one HD content stream and three picture-in-picture windows can be displayed concurrently can be determined by control module 202 based on the available resources of the device implementing system 200 (e.g., in device resource record 208) as well as resources that have been reserved as indicated in the tune manifests 206 of one or more other applications already running in system 200. The one HD content stream and three picture-in-picture windows may not be able to currently be displayed concurrently for a variety of reasons, such as resources of the device implementing system 200 already being used or reserved by other applications 204, insufficient resources in the environment in which the device implementing system 200 is located (e.g., insufficient bandwidth on a home network to receive an HD content stream given content streams already being received by other devices on the home network), and so forth.

If the one or more resources identified in the obtained tune manifest 206 can be satisfied by the device implementing system 200, then control module 202 runs the associated application 204. However, if the one or more resources identified in the obtained tune manifest 206 cannot be satisfied by the device implementing system 200, then control module 202 displays or otherwise presents a notification of a conflict. This notification indicates to a user of the device implementing system 200 that there is a potential conflict in running the requested application. This notification can optionally also indicate the nature of the conflict, such as by identifying the one or more resources from the tune manifest that a device resource record 208 in the case are not currently available.

As part of this notification, a query is displayed or otherwise presented requesting input as to whether running of the requested application is desired. In response to this query, a user input indicating to cancel running of the application can be received in response to which control module 202 does not run the requested application. Alternatively, a user input indicating to continue loading and running of the application can be received in response to which control module 202 runs the requested application. Additional notifications and/or queries can optionally subsequently be displayed or otherwise presented to inform the user of conflicts and/or how to resolve conflicts. These additional notifications and/or queries can be displayed or otherwise presented by control module 202 and/or another component or module of the device implementing system 200 and/or of another device.

In one or more embodiments, when a request to run an application 204 is received by control module 202, the requested application and its associated tune manifest are obtained. Alternatively, the tune manifest associated with the requested application can be obtained in response to the request to run the associated application, and then the associated application can be obtained if the one or more resources identified in the obtained tune manifest 206 can be satisfied by the device implementing system 200, or if a user input indicating to continue running of the application is received.

Returning to FIG. 1, in addition to determining whether a tune manifest can be satisfied by consumer device 100, the tune manifests associated with applications 136 can also be used to configure or alter settings of consumer device 100. A variety of different configuration registers, option settings, flags, and so forth can be set based on the tune manifests. For example, consumer device 100 may have a configuration flag that is to be set when playback module 110 and/or an application 136 tunes to an HD content stream, and can be cleared when playback module 110 and/or an application 136 tunes to an SD content stream. Accordingly, if a tune manifest for an application 136 identifies an HD content stream as a resource, then control module 104 sets this configuration flag prior to running the application 136.

Additionally, situations can arise where a change in a setting of consumer device 100 can be made so that a tune manifest can be satisfied by consumer device 100. This can allow, for example, reserved resources that may not actually be used to be released. For example, in one or more embodiments device 100 includes a configuration flag that is set by default for tuning to a higher resolution (e.g., HD) content stream. In response to this configuration flag being set, device 100 reserves sufficient resources (e.g., memory, bandwidth, etc.) for tuning to the higher resolution content stream, even though device 100 (including any applications running on device 100) may actually be tuned to one or more lower resolution (e.g., SD) content streams. If no application uses a higher resolution content stream (as identified by the tune manifests of the running applications), then this configuration flag can be cleared in order to free the reserved resources. The freeing of these reserved resources may allow one or more additional applications to be run (based on the tune manifests of the one or more additional applications) that otherwise would not have been able to run.

Figure 3:
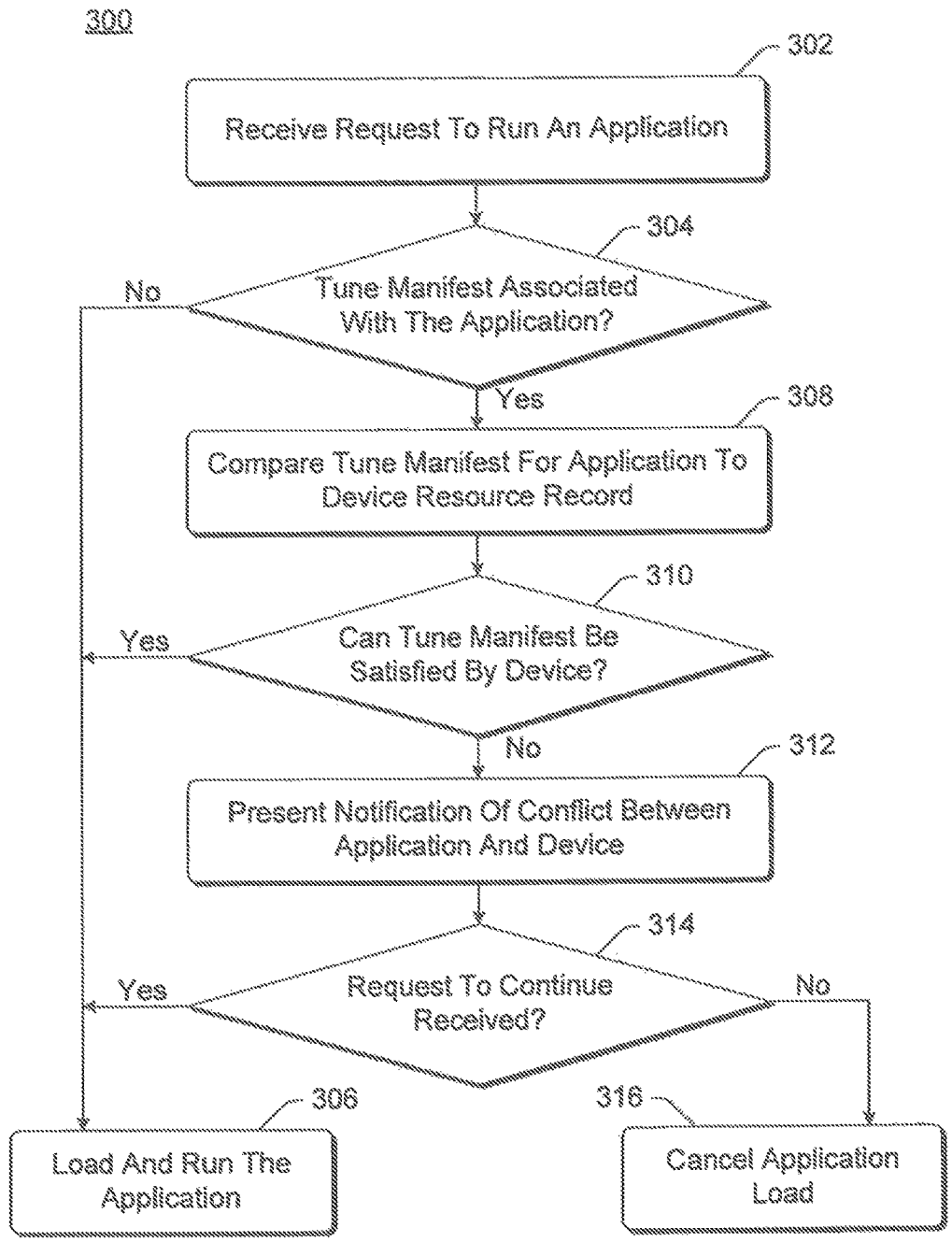
FIG. 3 is a flowchart illustrating an example process for using application tune manifests and tune state recovery in accordance with one or more embodiments.

FIG. 3 is a flowchart illustrating an example process 300 for using application tune manifests and tune state recovery in accordance with one or more embodiments. Process 300 is carried out by a device, such as consumer device 100 of FIG. 1, and can be implemented in software, firmware, hardware, or combinations thereof. Process 300 is an example process for using application tune manifests and tune state recovery; additional discussions of using application tune manifests and tune state recovery are included herein with reference to different figures.

In process 300, a request to run an application is received (act 302). This request can be received from a user or alternatively another component or module as discussed above.

A check is then made as to whether a tune manifest is associated with the application (act 304). Not all applications need to be associated with tune manifests, and in situations where the requested application does not have an associated tune manifest the requested application is loaded and run (act 306).

However, if the requested application does have an associated tune manifest, then the tune manifest associated with the requested application is compared to a device resource record of the device implementing process 300 (act 308). The device resource record identifies the available resources of the device implementing process 300 at any given time as discussed above.

A check is then made as to whether the tune manifest can be satisfied by the device implementing process 300 (act 310). As discussed above, this check is made by determining whether the one or more resources identified in the tune manifest can be satisfied by the device implementing process 300. One or more configuration settings can also optionally be changed in act 310 to allow the tune manifest to be satisfied by the device implementing process 300, as discussed above.

If the tune manifest can be satisfied by the device implementing process 300, then the requested application is loaded and run (act 306). However, if the tune manifest cannot be satisfied by the device implementing process 300, then a notification of a conflict between the application and the device is presented (act 312). This notification can also include a query as to whether running of the application is still desired as discussed above.

Process 300 then proceeds based on whether a request to continue with running the application is received (act 314). If a request to continue with running the application is received, then the requested application is loaded and run (act 306). However, if no request to continue with running the application is received, then loading and running of the application is canceled (act 316), and the application is not run.

Returning to FIG. 1, content playback module 110 can tune to a variety of different local and/or remote content sources as discussed above. Typically, when a request to run an application is received, playback of the content from the tuned to local and/or remote content sources ceases while the application is run. In one or more embodiments, when a request to run an application is received, control module 104 obtains a current device tune state from content playback module 110 and stores this current device tune state in device tune state store 108. The current device tune state includes an identifier of one or more content sources to which consumer device 100 is tuned at the current time (at the time the request to run the application is received). Situations can arise where content playback module 110 (and thus consumer device 100) is tuned to multiple different content sources concurrently. For example, content playback module 110 may be tuned to and playing back content from one source as the main content playback, and can be tuned to and playing back content from one or more other sources in one or more picture-in-picture windows. The current device tune state can also include an identifier of a particular channel (e.g., a television channel), of each of the one or more content sources to which consumer device is tuned at the current time.

Additionally, the current device tune state can also include an identifier of a location in content being received from the content source. This location can be, for example, the location in the content at the time the request to run the application is received. This location can be identified in different manners, such as an identifier of a particular frame in the content, a temporal offset into the content, and so forth. For example, if content playback module 110 is tuned to a digital video recorder (DVR) recording and is playing back content at a location 10 minutes and 35 seconds into the recording, an identifier of the particular recording on the DVR as well as an identifier of the location 10 minutes and 35 seconds into the recording can be saved as the current device tune state.

In addition to saving the current device tune state, one or more other actions can also be taken by control module 104. In one more embodiments, such an action is to begin recording of content from a tuned to content source. This recording can be recording on a local storage device (e.g., a local content source 102) or a remote storage device (e.g., remote content source 132). Optionally, the user can specify whether such recording of the content is to be performed in a variety of different manners, such as by setting a configuration value or preference for consumer device 100, responding to a query from control module 104 as to whether the recording of the content is to be performed, and so forth. The content from the tuned to content source can thus be recorded while the requested application is run, and the user can subsequently resume playback of the tuned to content source at the time that the request to run the application was received as discussed in more detail below. An identifier of the location of the content at the time the request to run the application is received can also be stored and playback of the content from that identified location can resume when the application exits.

It should be noted that if such recording of the content from a tuned to content source is performed, then this can release one or more resources and allow an application to run that otherwise would not have been able to run. For example, if an HD content stream is tuned to and being played back by content playback module 110, then the resources (e.g., memory) for playback of an HD content stream can be released because the HD content stream is being recorded rather than being played back. By way of another example, if an HD content stream is tuned to and being played back by content playback module 110, then the HD content stream could be recorded by a remote storage device, thereby reducing the bandwidth used by device 100 in the environment (e.g., a home) in which device 100 is operating.

When an application has stopped running, control module 104 determines that the application has exited. Control module 104 can determine that the application has exited in a variety of different manners, such as by monitoring the application, receiving an indication from the application that the application has exited, and so forth. In response to determining that the application has exited, control module 104 obtains the device tune state from device tune state store 108 and returns consumer device 100 to that obtained device tune state. Thus, playback module 110 is re-tuned to the same content source as module 110 was tuned to prior to running the application. Furthermore, if a location of the content that was being played back prior to running the application is included in the obtained device tune state, then playback module 110 resumes playback of that content from the identified location.

Figure 4:
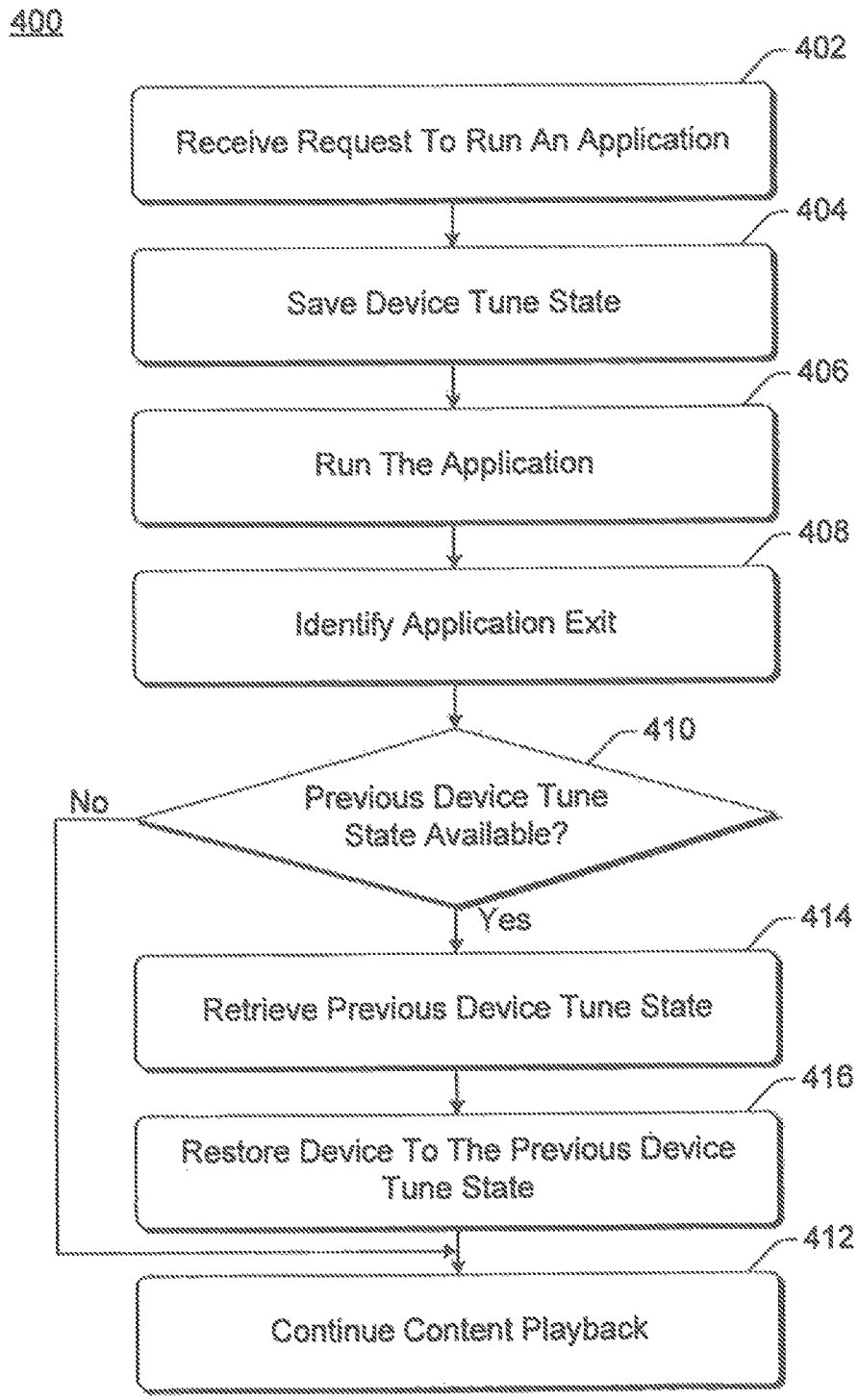
FIG. 4 is a flowchart illustrating an example process for using the application tune manifests and tune state recovery in accordance with one or more embodiments.

FIG. 4 is a flowchart illustrating an example process 400 for using the application tune manifests and tune state recovery in accordance with one or more embodiments. Process 400 is carried out by a device, such as consumer device 100 of FIG. 1, and can be implemented in software, firmware, hardware, or combinations thereof. Process 400 is an example process for using application tune manifests and tune state recovery; additional discussions of using application tune manifests and tune state recovery are included herein with reference to different figures.

In process 400, a request to run an application is received (act 402). This request can be received from a user or alternatively another component or module as discussed above.

A device tune state of the device is saved (act 404). As discussed above, this device tune state includes an identifier of one or more content sources (and optionally one or more channels of those one or more sources) to which the device implementing process 400 is tuned when the request is received in act 402. This device tune state can also include an identifier of the location of the content at the time the request to run the application is received as discussed above.

The requested application is also run (act 406). Whether the application is run or a notification of a conflict between the application and the device implementing process 400 is presented can be determined as discussed above with respect to process 300 of FIG. 3.

Eventually, the application exits and the exiting of the running application is identified (act 408). This exiting of a running application can be identified or determined in a variety of different manners as discussed above.

A check is then made as to whether a previous device tune state is available (act 410). As discussed above, a current device tune state when a request to run an application is received can be stored. However situations can arise where no content source was tuned to prior to running the application and/or no device tune state was stored, in which case no previous device tune state is available.

If no previous device tune state is available then content playback continues (act 412). The content source that is tuned to for this playback can be a default tuned to content source, a randomly selected content source, or alternatively a content source selected in some other manner. As there is no previous device tune state available, there is no stored identifier of a content source that the playback module can be re-tuned to.

However, if a previous device tune state is available, then the previous device tune state is retrieved (act 414). This previous device tune state can be retrieved, for example, from device tune state store 108 of FIG. 1.

The device is then restored to the previous device tune state (act 416), and content playback using the restored device tune state continues (act 412). As the retrieved device tune state can identify a content source, the restoring of the previous device tune state can include re-tuning the content playback module to the content source (and optionally channel of the content source) identified in the device tune state. The retrieved device tune state can also identify a location of the content being played back from the tuned-to content source, and thus playback of the content can continue from the identified location.

It should also be noted that, in situations where the tuned to content was recorded while the requested application is run, the restoring of the device to the previous device tune state in act 416 can include playing back of the content from the recording. Thus, in such situations the restoring of the previous device tune state can include tuning the content playback module to a different content source (e.g., a recording device) than the content was being obtained from prior to running the application. Alternatively, this content source (e.g., the recording device) can be viewed as the content source to which the device was tuned prior to running the application.

Figure 5:
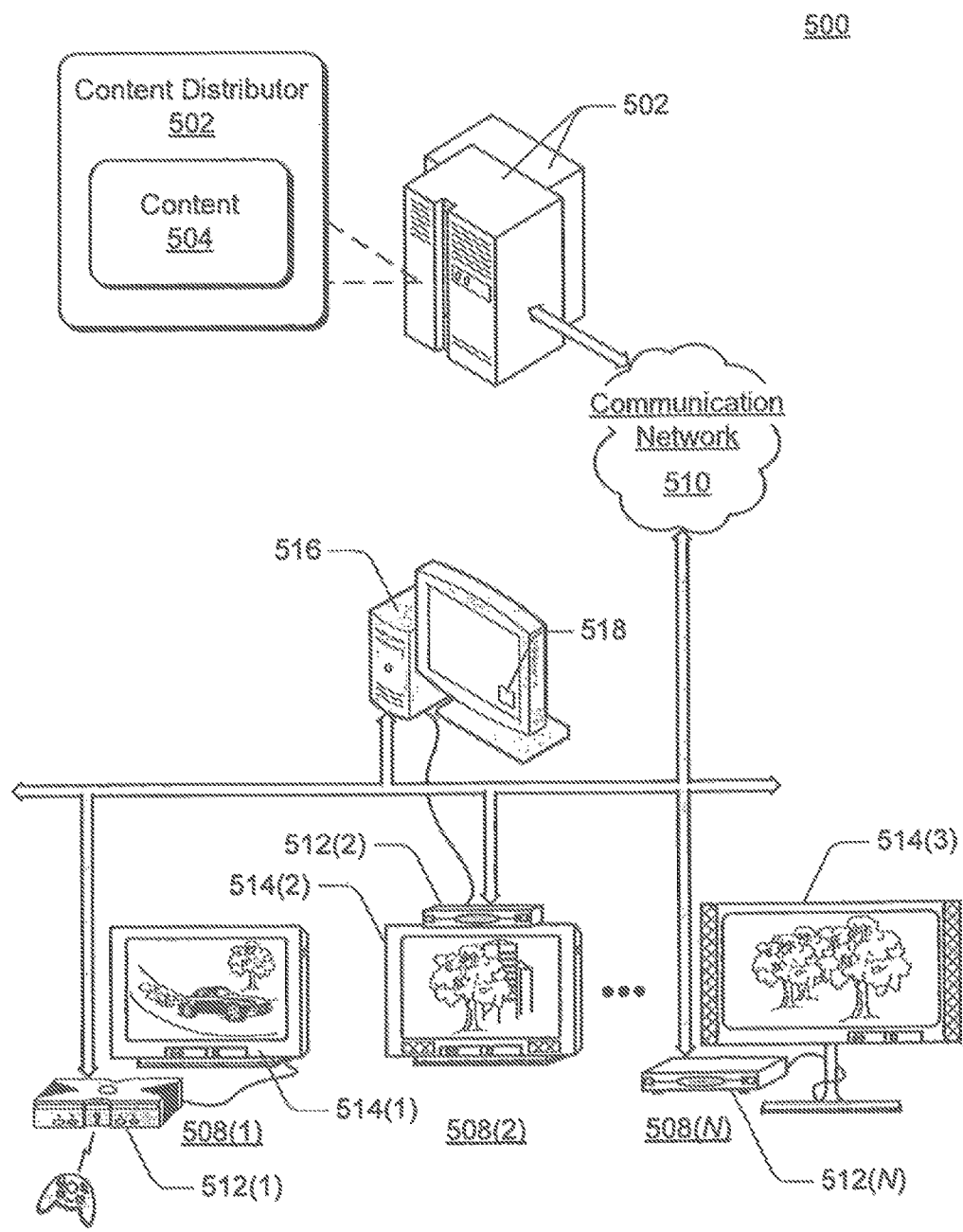
FIG. 5 illustrates an example system in which one or more embodiments of the application tune manifests and tune state recovery can be implemented.

FIG. 5 illustrates an example system 500 in which one or more embodiments of the application tune manifests and tune state recovery can be implemented. System 500 includes one or more content distributors 502 that communicate content 504 to any number "N" of various television client systems 508(1-N) via a communication network 510. Client systems 508 can each be, for example, a different type (or alternatively the same types) of consumer device 100 of FIG. 1. Communication network 510 can be implemented to include an IP-based network that facilitates content distribution and data communication between the content distributor(s) 502 and any number of television client devices.

Each of client systems 508(1-N) includes a respective television client device 512(1-N) and a respective display device 514(1-N), such as any type of television, monitor, LCD, projector, or similar television-based display system that renders audio, video, and/or image data. Any of client devices 512(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of television client devices 512(1-N) may also be associated with a user (e.g., a person) and/or an entity that operates a client device such that a television client device describes logical clients that include users, software, and/or devices.

Any of television client devices 512(1-N) of the respective client systems 508(1-N) can be implemented with one or more processors, memory components, and a content playback system. Additionally, each of television client devices 512(1-N) can be configured for communication with any number of different content distributors 502 to receive any type of content 504 via the communication network 510. Further, any of the television client devices 512(1-N) can be implemented with any number and combination of differing components as further described with reference to the example client device shown in FIG. 6.

Figure 6:
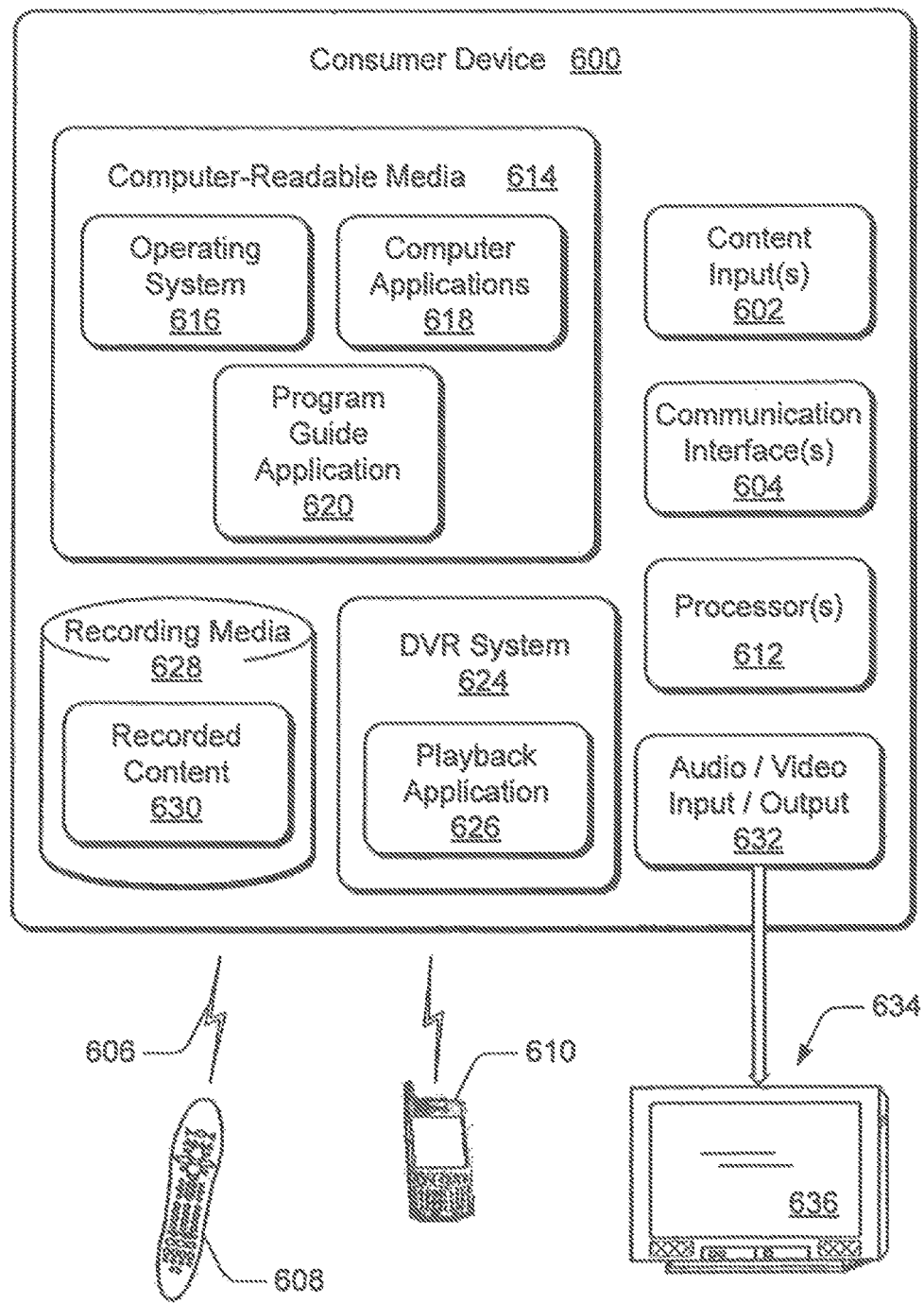
FIG. 6 illustrates various components of an example consumer device that can implement one or more embodiments of the application tune manifests and tune state recovery.

FIG. 6 illustrates various components of an example consumer device 600 that can be implemented as any form of a computing, electronic, or television client device to implement one or more embodiments of the application tune manifests and tune state recovery. For example, consumer device 600 can be implemented as consumer device 100 shown in FIG. 1, and/or as any of the client devices 512(1-N) of client systems 508(1-N) shown in FIG. 5. In various embodiments, consumer device 600 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Consumer device 600 includes one or more content inputs 602 that may include Internet Protocol (IP) inputs over which streams of content are received via an IP-based network. Consumer device 600 further includes communication interface(s) 604 that can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between consumer device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Consumer device 600 also includes one or more processors 612 (e.g., any of microprocessors, controllers, and the like) which process various computer-executable instructions to control the operation of device 600, to communicate with other electronic and computing devices, and to implement embodiments of the application tune manifests and tune state recovery. Consumer device 600 can be implemented with computer-readable media 614, such as one or more memory components, examples of which include random access memory (RAM), nonvolatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 614 provides data storage mechanisms to store various information and/or data such as software applications and any other types of information and data related to operational aspects of consumer device 600. For example, an operating system 616 and/or other computer applications 618 can be maintained as software applications with the computer-readable media 614 and executed on processor(s) 612 to implement embodiments of the application tune manifests and tune state recovery.

Consumer device 600 can also include a program guide application 620 that is implemented to process program guide data and generate program guides for display. A program guide enables a viewer to navigate through an onscreen display and locate various content such as broadcast programs, recorded programs, video on-demand programs and movies, interactive game selections, network-based applications, and other content of interest to the viewer.

Consumer device 600 can also include a DVR system 624 with playback application 626, and recording media 628 to maintain recorded content 630 that consumer device 600 receives and/or records. Further, consumer device 600 may access or receive additional recorded content that is maintained with a remote data store (not shown). Consumer device 600 may also receive content from a video on-demand server, or content that is maintained at a broadcast center or content distributor that distributes the content to subscriber sites and client devices. Playback application 626 is a video control application that can be implemented to control the playback of content, the recorded content 630, and/or other video on-demand content, music, and any other audio, video, and/or image content which can be rendered and/or displayed for viewing. Playback application 626 can be, for example, content playback module 110 of FIG. 1.

Consumer device 600 also includes an audio and/or video output 632 that provides audio and/or video data to an audio rendering and/or display system 634. Audio rendering and/or display system 634 can include any devices that process, display, and/or otherwise render audio, video, and image data. Video signals and audio signals can be communicated from consumer device 600 to a display device 636 via an RF (radio frequency) link, S-video link, composite video link, component video link, DVI (digital video interface), analog audio connection, or other similar communication link. Alternatively, audio rendering and/or display system 634 can be implemented as integrated components of the example consumer device 600. Consumer device 600 along with the audio rendering and/or display system 634 is an example of a viewing system that can be implemented in a household viewing area for viewing television programs and/or receiving other television content.

Figure 7:
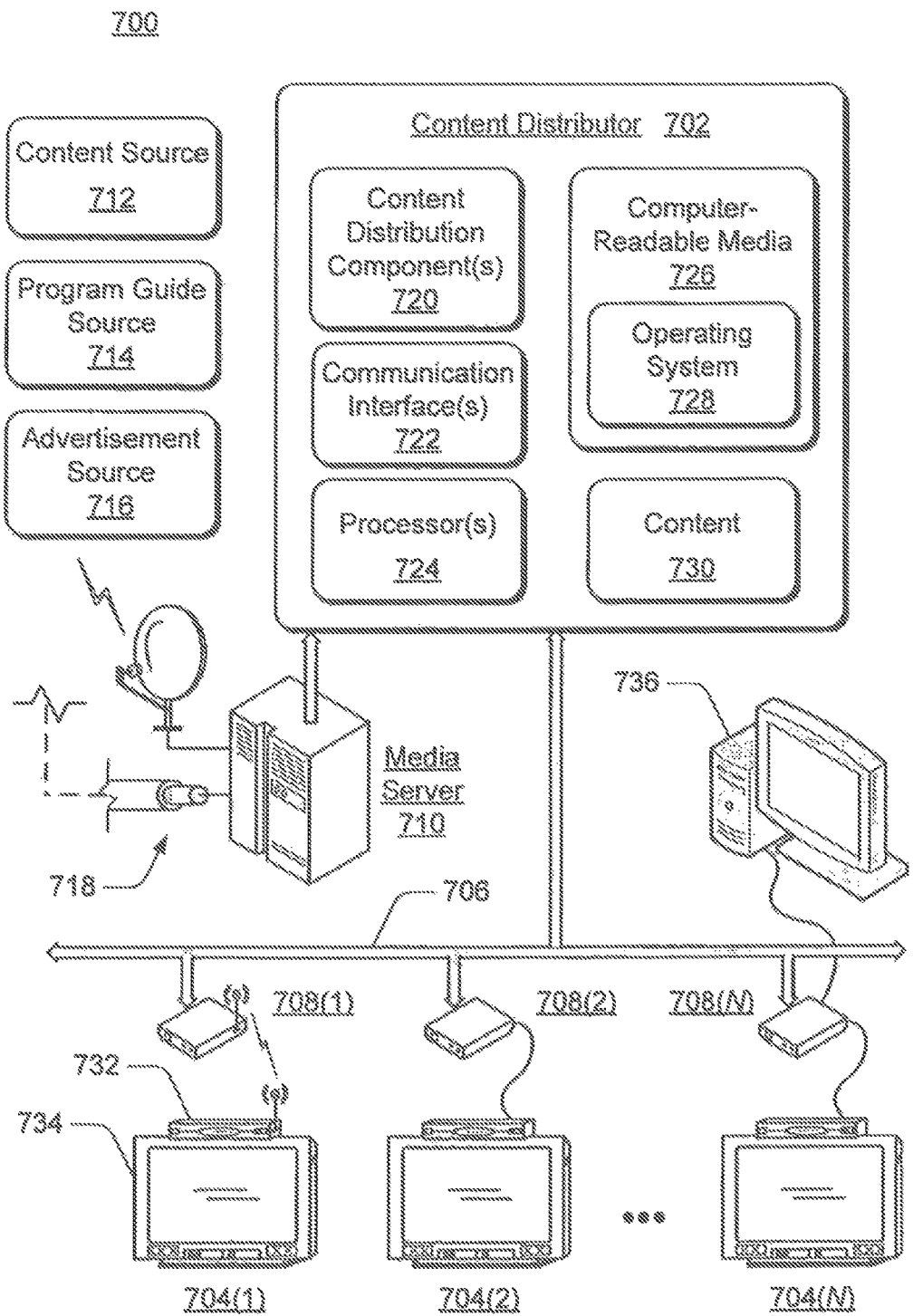
FIG. 7 illustrates an example entertainment and information system in which one or more embodiments of the application tune manifests and tune state recovery can be implemented.

FIG. 7 illustrates an example entertainment and information system 700 in which one or more embodiments of the application tune manifests and tune state recovery can be implemented. System 700 facilitates the distribution of content, program guide data, and advertising content to multiple viewers and to multiple viewing systems. System 700 includes a content distributor 702 and any number "N" of client systems 704(1-N) each configured for communication via a communication network 706. Each client system 704(1-N) is an example of the client systems 508(1-N) described with reference to FIG. 5. Each of the client systems 704(1-N) can receive data streams of content, content, program guide data, advertising content, closed captioning data, and the like from content server(s) of content distributor 702 via communication network 706.

Communication network 706 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other content distribution network. Additionally, communication network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content distributor 702 and client systems 704(1-N).

System 700 includes a media server 710 that receives content from a content source 712, program guide data from a program guide source 714, and advertising content from an advertisement source 716. In one or more embodiments, media server 710 represents an acquisition server that receives the audio and video content from content source 712, an EPG server that receives the program guide data from program guide source 714, and/or an advertising management server that receives the advertising content from the advertisement source 716.

Content source 712, program guide source 714, and advertisement source 716 control distribution of the content, the program guide data, and at least some of the advertising content to the media server 710 and/or to other servers. The content, program guide data, and advertising content can be distributed via various transmission media 718, such as satellite transmission, radio frequency transmission, cable transmission, and/or via any number of other wired or wireless transmission media. In this example, media server 710 is shown as an independent component of system 700 that communicates the content, program guide data, and advertising content to content distributor 702. In an alternate implementation, media server 710 can be implemented as a component of content distributor 702.

Content distributor 702 is representative of a headend service in a content distribution system, for example, that provides the content, program guide data, and advertising content to multiple subscribers (e.g., the client systems 704(1-N)). Content distributor 702 can be implemented as a satellite operator, a network television operator, a cable operator, and the like to control distribution of content, program and advertising content, such as movies, television programs, commercials, music, and other audio, video, and/or image content to client systems 704(1-N).

Content distributor 702 includes various content distribution components 720 to facilitate content processing and distribution, such as a subscriber manager, a device monitor, and one or more content servers. The subscriber manager manages subscriber data, and the device monitor monitors client systems 704(1-N) (e.g., and the subscribers), and maintains monitored client state information.

Although the various managers, servers, and monitors of content distributor 702 (to include media server 710 in one or more embodiments) are described as distributed, independent components of content distributor 702, any one or more of the managers, servers, and monitors can be implemented together as a multi-functional component of content distributor 702. Additionally, any one or more of the managers, servers, and monitors described with reference to system 700 can implement features and embodiments of the application tune manifests and tune state recovery.

Content distributor 702 includes communication interface(s) 722 that can be implemented as any type of interface to communicate and receive data from client devices of the television system. Content distributor 702 also includes one or more processors 724 (e.g., any of microprocessors, controllers, and the like) which process various computer-executable instructions to control the operation of content distributor 702. Content distributor 702 can be implemented with computer-readable media 726 which provides data storage to maintain software applications such as an operating system 728 and content 730 for distribution to the client systems 704(1-N).

Client systems 704(1-N) can each be implemented to include a client device 732 and a display device 734 (e.g., a television, LCD, and the like). A client device 732 of a respective client system 704 can be implemented in any number of embodiments, such as a set-top box, a digital video recorder (DVR) and playback system, an appliance device, a gaming system, and as any other type of client device that may be implemented in an entertainment and information system. In an alternate embodiment, client system 704(N) is implemented with a computing device 736 as well as a client device. The computing device 736 is an example of a connected data store that can record and maintain content for a client device. Additionally, any client device 732 of a respective client system 704 can implement features and embodiments of the application tune manifests and tune state recovery as described herein.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices. The features of the application tune manifests and tune state recovery described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for resuming content playback, the method comprising:
   receiving a request to run an application on a device during playback of media content on the device, wherein the media content is received from a content source;
   based on receiving the request to run the application:
      storing an indication that identifies the content source in response to receiving the request to run the application;
      running the application, wherein playback of the media content is paused while the application is run;
      identifying when the application is exited;
      based on identifying that the application is exited:
         retrieving the indication of the content source;
         automatically accessing, using the device, the content source identified in the retrieved indication; and
         resuming playback of the media content;
   receiving a request to run an additional application, wherein the additional application is associated with a tune manifest that identifies additional hardware resources of the device that the additional application may use;
   comparing the tune manifest to a device resource record stored on the device;
   determining, based at least on the comparing, whether the additional hardware resources may be satisfied by the device; and
   generating for display a notification of a conflict between the additional application and the device.

2. The method of claim 1, wherein the application is associated with the tune manifest that identifies one or more hardware resources of the device that the respective application may use.

3. The method of claim 2, wherein the one or more hardware resources of the device comprise at least one of: an amount of memory of the device and a bandwidth capacity of a network to which the device is coupled.

4. The method of claim 2, wherein running the application comprises:
   comparing the tune manifest to a device resource record stored on the device; and
   determining, based at least on the comparing, whether the one or more resources identified in the tune manifest can be satisfied by the device.

5. The method of claim 4, wherein the device resource record identifies one or more hardware resources that may be satisfied by the device.

6. The method of claim 4, wherein the device resource record identifies one or more hardware resources of the device that have been reserved for use by an additional application.

7. The method of claim 1, wherein identifying when the application is exited comprises monitoring the application, receiving an indication from the application that the application has exited, or receiving a request to cancel running the application.

8. The method of claim 1, further comprising downloading the application from a remote service.

9. The method of claim 1, further comprising retrieving, in response to receiving the request to run the application, data that indicates that the device was accessing the content source at a time that the request to run the application was received.

10. A system for resuming content playback, the system comprising:
    processing circuitry configured to:
       receive a request to run an application on a device during playback of media content on the device, wherein the media content is received from a content source;
       based on receiving the request to run the application:
          store an indication that identifies the content source in response to receiving the request to run the application;
          run the application, wherein playback of the media content is paused while the application is run;
          identify when the application is exited;
          based on identifying that the application is exited:
             retrieve the indication of the content source;
             automatically access, using the device, the content source identified in the retrieved indication; and
             resume playback of the media content;
       receive, a request to run an additional application, wherein the additional application is associated with a tune manifest that identifies additional hardware resources of the device that the additional application may use;
       compare the tune manifest to a device resource record stored on the device;
       determine, based at least on the comparing, whether the additional hardware resources may be satisfied by the device; and
       generate for display a notification of a conflict between the additional application and the device.

11. The system of claim 10, wherein the application is associated with the tune manifest that identifies one or more hardware resources of the device that the respective application may use.

12. The system of claim 11, wherein the one or more hardware resources of the device comprise at least one of: an amount of memory of the device and a bandwidth capacity of a network to which the device is coupled.

13. The system of claim 11, wherein the processing circuitry is configured to run the application by:
    comparing the tune manifest to a device resource record stored on the device; and
    determining, based at least on the comparing, whether the one or more resources identified in the tune manifest can be satisfied by the device.

14. The system of claim 13, wherein the device resource record identifies one or more hardware resources that may be satisfied by the device.

15. The system of claim 13, wherein the device resource record identifies one or more hardware resources of the device that have been reserved for use by an additional application.

16. The system of claim 10, wherein the processing circuitry is configured to identify when the application is exited by monitoring the application, receiving an indication from the application that the application has exited, or receiving a request to cancel running the application.

17. The system of claim 10, wherein the processing circuitry is further configured to download the application from a remote service.

18. The system of claim 10, wherein the processing circuitry is further configured to retrieve, in response to receiving the request to run the application, data that indicates that the device was accessing the content source at a time that the request to run the application was received.

* * * * *